United States Patent
Arora

(10) Patent No.: US 10,511,508 B2
(45) Date of Patent: Dec. 17, 2019

(54) NETWORK PACKET FORWARDING SYSTEMS AND METHODS TO PUSH PACKET PRE-PROCESSING TASKS TO NETWORK TAP DEVICES

(71) Applicant: IXIA, Calabasas, CA (US)

(72) Inventor: Deepesh Arora, Austin, TX (US)

(73) Assignee: Keysight Technologies Singapore (Sales) PTE. LTD., Singapore (SG)

( * ) Notice: Subject to any disclaimer, the term of this patent is extended or adjusted under 35 U.S.C. 154(b) by 88 days.

(21) Appl. No.: 15/147,221

(22) Filed: May 5, 2016

(65) Prior Publication Data

US 2017/0324632 A1 Nov. 9, 2017

(51) Int. Cl.
*H04L 12/26* (2006.01)
*H04L 29/06* (2006.01)
(Continued)

(52) U.S. Cl.
CPC .......... *H04L 43/0852* (2013.01); *H04L 43/04* (2013.01); *H04L 43/12* (2013.01);
(Continued)

(58) Field of Classification Search
CPC ..... H04L 43/0852; H04L 45/74; H04L 47/32; H04L 43/02; H04L 43/026; H04L 43/04; H04L 41/14; H04L 69/22; H04L 47/10; H04L 43/10; H04L 45/38; H04L 43/12; H04L 63/1441
(Continued)

(56) References Cited

U.S. PATENT DOCUMENTS 6,115,393 A 9/2000 Engel et al.
7,203,173 B2 4/2007 Bonney et al.
(Continued)

FOREIGN PATENT DOCUMENTS

KR 101466937 12/2014

OTHER PUBLICATIONS

Hofstede et al., "Flow Monitoring Explained: From Packet Capture to Data Analysis With NetFlow and IPFIX", IEEE, 31 pgs. (May 2014).
(Continued)

*Primary Examiner* — Un C Cho
*Assistant Examiner* — Shah M Rahman

(57) ABSTRACT

Network packet forwarding systems and methods are disclosed to push pre-processing tasks to network tap devices. In certain embodiments, packet flows from multiple monitoring points within a packet network communication system are monitored by a plurality of network tap devices to generate tapped packet flows associated with monitored network traffic flows. The tapped packet flows are transmitted from each network tap device to a tap controller, and the tap controller generates pre-processing rules based upon the tapped packet flows. Control messages including the pre-processing rules are then transmitted from the tap controller to the network tap devices, and the tapped packet flows are pre-processed at the network tap devices using the pre-processing rules to generate pre-processed packet flows. These pre-processed packet flows are then transmitted back to the tap controller where they are further processed and output to one or more destination devices.

16 Claims, 9 Drawing Sheets

(51) Int. Cl.
*H04L 12/741* (2013.01)
*H04L 12/823* (2013.01)

(52) U.S. Cl.
CPC .......... *H04L 63/1441* (2013.01); *H04L 45/74* (2013.01); *H04L 47/32* (2013.01)

(58) Field of Classification Search
USPC ........................................................ 370/252
See application file for complete search history.

(56) References Cited

U.S. PATENT DOCUMENTS

| | | | |
|---|---|---|---|
| 7,424,018 B2* | 9/2008 | Gallatin | H04L 12/4645 370/389 |
| 7,460,484 B2* | 12/2008 | Roberts | H04L 63/00 370/244 |
| 7,515,546 B2 | 4/2009 | Gaspard et al. | |
| 7,593,351 B1 | 9/2009 | Zioulas et al. | |
| 8,059,530 B1* | 11/2011 | Cole | H04L 41/5025 370/229 |
| 8,934,495 B1* | 1/2015 | Hilton | H04L 67/36 370/401 |
| 9,008,080 B1* | 4/2015 | Mehta | H04L 49/60 370/327 |
| 9,110,703 B2 | 8/2015 | Santos et al. | |
| 9,680,728 B2 | 6/2017 | Besser | |
| 9,787,567 B1* | 10/2017 | Mehta | H04L 43/16 |
| 10,291,533 B1* | 5/2019 | Mehta | H04L 41/0806 |
| 2005/0076227 A1* | 4/2005 | Kang | H04L 63/1416 713/188 |
| 2006/0021040 A1* | 1/2006 | Boulanger | H04L 43/00 726/23 |
| 2006/0280207 A1 | 12/2006 | Guarini et al. | |
| 2007/0081553 A1 | 4/2007 | Cicchetti et al. | |
| 2009/0168659 A1* | 7/2009 | Matityahu | H04L 43/00 370/252 |
| 2009/0245128 A1* | 10/2009 | Matityahu | H04L 43/12 370/252 |
| 2011/0004698 A1 | 1/2011 | Wu | |
| 2011/0116510 A1 | 5/2011 | Breslin et al. | |
| 2011/0206055 A1* | 8/2011 | Leong | H04L 49/00 370/401 |
| 2012/0106354 A1* | 5/2012 | Pleshek | H04L 43/028 370/241 |
| 2012/0176917 A1* | 7/2012 | Matityahu | H04L 43/12 370/250 |
| 2012/0207174 A1 | 8/2012 | Shieh | |
| 2013/0031233 A1 | 1/2013 | Feng et al. | |
| 2013/0094500 A1* | 4/2013 | Rotvold | H04L 63/0245 370/389 |
| 2013/0215748 A1 | 8/2013 | Ratakonda et al. | |
| 2013/0291109 A1 | 10/2013 | Staniford et al. | |
| 2014/0105216 A1* | 4/2014 | McDysan | H04L 67/1095 370/400 |
| 2014/0229605 A1 | 8/2014 | Besser | |
| 2015/0096022 A1* | 4/2015 | Vincent | G06F 21/566 726/23 |
| 2015/0113132 A1* | 4/2015 | Srinivas | H04L 41/0816 709/224 |
| 2015/0263889 A1 | 9/2015 | Newton | |
| 2015/0281025 A1* | 10/2015 | Wallbaum | H04L 43/062 370/252 |
| 2015/0319030 A1 | 11/2015 | Nachum | |
| 2016/0094418 A1 | 3/2016 | Raney | |
| 2016/0110211 A1 | 4/2016 | Karnes | |
| 2016/0234091 A1* | 8/2016 | Emmadi | H04L 43/12 |
| 2016/0373304 A1* | 12/2016 | Sharma | H04L 41/0893 |
| 2017/0099195 A1 | 4/2017 | Raney | |
| 2017/0111246 A1* | 4/2017 | Shaw | H04L 43/08 |
| 2017/0118102 A1 | 4/2017 | Majumder et al. | |
| 2017/0142132 A1* | 5/2017 | Curcio | H04L 63/1408 |
| 2017/0163510 A1 | 6/2017 | Arora et al. | |
| 2017/0324709 A1* | 11/2017 | Ahn | H04L 63/0236 |

OTHER PUBLICATIONS

Ixia, Ixia xFilter, Data Sheet, 5 pgs. (May 2015).
Ixia, Ixia Phantom vTap With TapFlow Filtering, Data Sheet, 4 pgs. (Jul. 2015).
Ixia, Ixia Flex Tap, Data Sheet, 5 pgs. (Oct. 2015).
Search Report and Written Opinion; PCT/US17/028517, dated Apr. 20, 2017, 12 pgs.

\* cited by examiner

| RULE | TAP 110A | TAP 110B | TAP 116A | TAP 116B |
|---|---|---|---|---|
| 452 — DROP PACKETS WITH 102A SOURCE AND 102B DESTINATION | | X | X | X |
| 454 — DROP PACKETS WITH 102B SOURCE AND 102A DESTINATION | X | | X | X |

| RULE | TAP 110A | TAP 110B | TAP 116A | TAP 116B |
|---|---|---|---|---|
| 472 — PASS ONLY "X" TYPE PACKETS | X | X | | X |
| 474 — REMOVE/MODIFY PACKET CONTENTS | X | | X | X |

NETWORK PACKET FORWARDING SYSTEMS AND METHODS TO PUSH PACKET PRE-PROCESSING TASKS TO NETWORK TAP DEVICES

TECHNICAL FIELD

This technical field relates to network packet forwarding systems for network packet communication systems.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Copies of packet within network packets flows are often obtained and forwarded using network hubs, test access ports available on network devices, and/or switched port analyzer (SPAN) ports available on network switch systems. Other network tap devices can also be used to obtain and forward copies of network packets being communicated within a network communication system.

To help alleviate the problem of limited access to network packets for monitoring, tool aggregation devices or network packet brokers have been developed as packet forwarding systems that allow shared access to the monitored network packets. These packet forwarding systems allow users to aggregate the processing of packets from multiple network monitoring points and to forward these packets to different network monitoring tools based upon desired filtering parameters. The network monitoring tools can be used, for example, to analyze packets being communicated within a network communication system to identify various threats to the network and/or to identify communication problems within the network.

Current network visibility systems, such as tool aggregation devices or network packet brokers, are designed as intelligent centralized processing engines that receive copies of packets and process packet contents to perform various network visibility and packet forwarding functions. In contrast, physical and virtual network tap devices are typically distributed at edges of the network communication system and are typically designed as relatively unintelligent devices that simply copy packets from edge network monitoring points and forward these copied packets to centralized packet brokers for further intelligent processing and/or forwarding to additional network systems such as network monitoring tools. For example, physical and virtual network tap devices can be deployed at numerous monitoring points within a network, and these network tap devices can forward copies of packets from these monitoring points to a centralized network packet broker where the packets are further processed and forwarded to network monitoring tools.

Prior to forwarding packets to network monitoring tools, however, the network packet brokers often apply various packet processing functions such as de-duplication of packet flows, packet payload truncation, removal of packet headers, identification of relevant packets, and/or other packet processing functions to reduce the amount of packet data being forwarded to and then processed by the network monitoring tools. Network packet brokers can also adjust or modify packets in other ways prior to forwarding them to various network monitoring tools. However, because the same or similar packet flows can potentially be forwarded by different network tap devices located at different monitoring points within a network communication system, the network packet brokers can receive extremely large amounts of packet traffic that needs to be processed including redundant and/or non-relevant packet traffic. Further, because the traffic being monitored may have wide variations and include high bandwidth communication sessions, the aggregated packet traffic volume being processed and forwarded by network packet brokers can be significant. As such, network packet brokers are often required to have significant processing resources so that the network packet brokers can process large volumes of packet traffic and perform various packet processing functions without significant delays.

SUMMARY

Network packet forwarding systems and methods are disclosed to push pre-processing tasks to network tap devices. In certain embodiments, packet flows from multiple monitoring points within a packet network communication system are monitored by a plurality of network tap devices to generate tapped packet flows associated with network traffic flowing through the multiple monitored network points. The tapped packet flows are then transmitted from each network tap device to a tap controller. The tap controller then generates one or more pre-processing rules for the network tap devices based upon an analysis of the tapped packet flows. Control messages including the pre-processing rules are then transmitted from the tap controller to the network tap devices. The tapped packet flows are then pre-processed at the multiple tap devices using the pre-processing rules to generate pre-processed packet flows. These pre-processed packet flows are then transmitted to the tap controller. The tap controller then further processes the pre-processed packet flows to generate output packet flows. The output packet flows are then forwarded to one or more destination devices. Other features and variations can be implemented, if desired, and related systems and methods can be utilized, as well.

For one embodiment, a method to forward packets from multiple monitoring points within a packet network communication system to one or more destination devices is disclosed including monitoring, with a plurality of network tap devices, multiple points within a network to generate tapped packet flows associated with network traffic flowing through the multiple points; transmitting the tapped packet flows from each network tap to a tap controller; generating, with the tap controller, one or more pre-processing rules for the network tap devices based upon the tapped packet flows; transmitting control messages from the tap controller to the network tap devices, the control messages including the pre-processing rules; pre-processing the tapped packet flows at the multiple network tap devices using the pre-processing rules to generate pre-processed packet flows; transmitting the pre-processed packet flows to the tap controller; further processing the pre-processed packet flows with the tap controller to generate output packet flows; and forwarding the output packet flows to one or more destination devices.

In additional embodiments, the control messages from the tap controller to the network tap devices include different sets of pre-processing rules for different network tap devices. In further embodiments, the method includes transmitting a learning command message from the tap controller to the network tap devices to cause the network tap devices to transmit the tapped packet flows to the tap controller. In still further embodiments, the method includes discovering, with the tap controller, processing capabilities of the network tap devices. In further embodiments, the discovering is triggered by at least one of an interrogation message broadcast by the tap controller to the network tap devices or messages sent from the network tap devices to the tap controller when the network tap devices become operable within the network.

In additional embodiments, the one or more destination devices include one or more network monitoring tools. In further embodiments, the pre-processing at the network tap devices includes selecting only portions of monitored network traffic to be the pre-processed packet flows for the network tap devices. In still further embodiments, the selecting includes at least one of dropping duplicate packets within the pre-processed packet flows or passing only a particular type of packet within the pre-processed packet flows.

In additional embodiments, the pre-processing at the network tap devices includes modifying packets within the tapped packet flows to form the pre-processed packet flows. In further embodiments, the method includes, at each network tap device, adding a signature to packets included within the pre-processed packet flow, the signature indicating pre-processing applied to the packets.

For one embodiment, a network system to forward packets from multiple monitoring points within a packet network communication system to one or more destination devices is disclosed including a plurality of network tap devices located at multiple points within a network and a tap controller. The network tap devices have tapped packet flows associated with network traffic flowing through the multiple points as outputs in a first mode and have pre-processed packet flows based upon one or more pre-processing rules as outputs in a second mode. The tap controller has the tapped packet flows from each network tap device as inputs during a first mode and has the pre-processed packet flows from each network tap device as inputs during a second mode, and the tap controller is configured to generate one or more pre-processing rules for the network tap devices based upon the tapped packet flows, to transmit control messages to the network tap devices including the pre-processing rules, to further process the pre-processed packet flows, and to forward output packet flows to one or more destination devices.

In additional embodiments, the control messages include different sets of pre-processing rules for different network tap devices. In further embodiments, the tap controller is further configured to transmit a learning command message to the network tap devices to cause the network tap devices to generate the tapped packet flows in the first mode. In still further embodiments, the tap controller is configured to discover processing capabilities of the network tap devices. In further embodiments, a discovery mode is triggered through at least one of an interrogation message broadcast by the tap controller to the network tap devices or messages sent from the network tap devices to the tap controller when the network tap devices become operable within the network.

In additional embodiments, the one or more destination devices includes one or more network monitoring tools. In further embodiments, the one or more pre-processing rules are configured to cause the network tap devices to select only portions of monitored network traffic to be the pre-processed packet flow for the network tap devices. In still further embodiments, the one or more pre-processing rules are configured to cause the network tap devices to adjust the tapped packets by at least one of dropping duplicate packets within the pre-processed packet flows or including only a particular type of packets within the pre-processed packet flows.

In additional embodiments, the one or more pre-processing rules are configured to cause the network tap devices to modify the tapped packet flows to form the pre-processed packet flows. In further embodiments, the network tap devices are configured to add a signature to packets included within the pre-processed packet flows, the signature indicating pre-processing applied to the packets.

Different or additional features, variations, and embodiments can be implemented, if desired, and related systems and methods can be utilized, as well.

DESCRIPTION OF THE DRAWINGS

It is noted that the appended drawings illustrate only example embodiments and are, therefore, not to be considered limiting of their scope, for the illustrated embodiments may admit to other equally effective embodiments.

DETAILED DESCRIPTION

Figure 1:
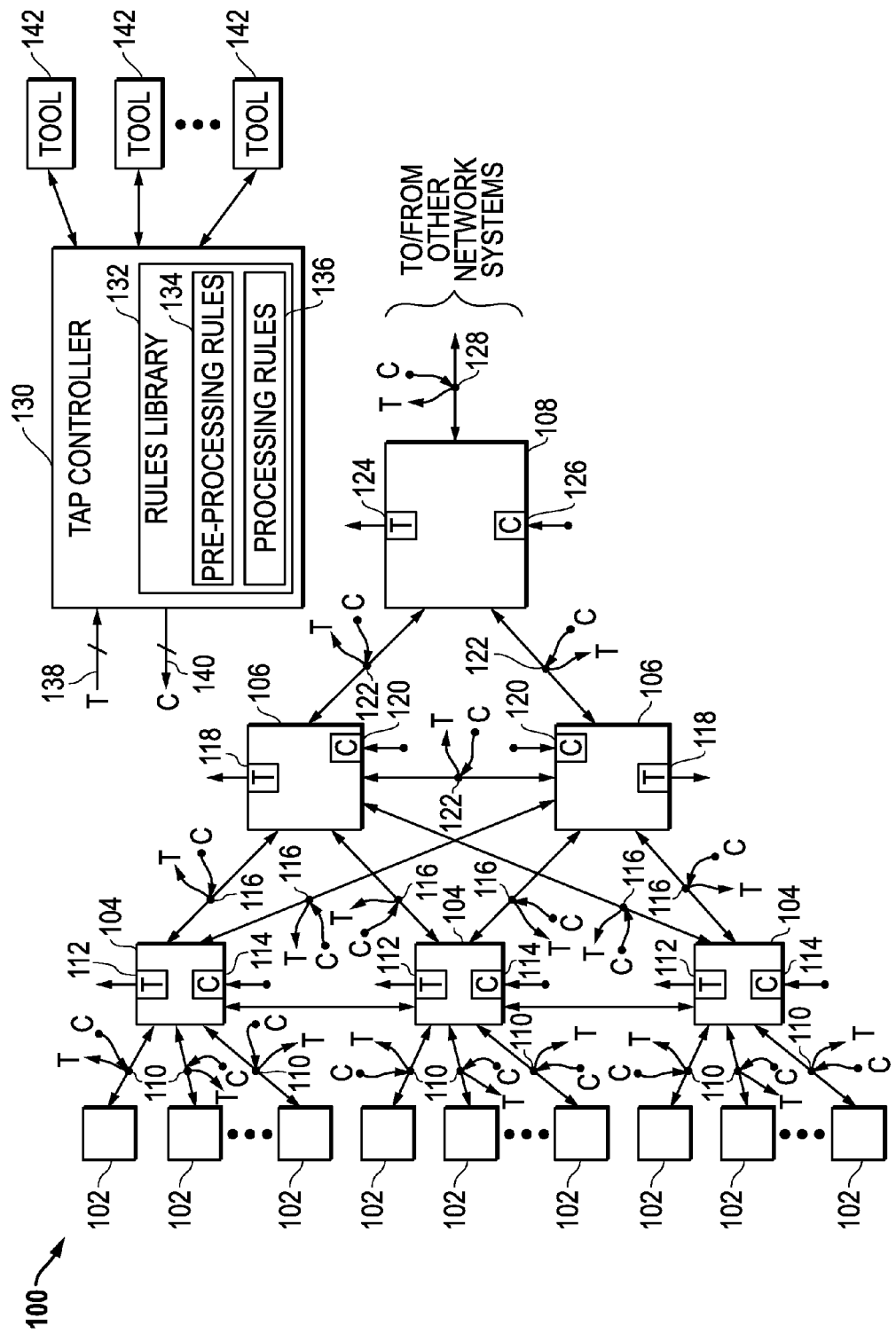
FIG. 1 is a block diagram of an example embodiment for a network communication system including a tap controller that analyzes network traffic and generates pre-processing rules that are pushed to edge monitoring devices provided by various network tap devices including stand-alone network tap devices and routers/gateways operating in part as network tap devices.

Network packet forwarding systems and methods are disclosed to push pre-processing tasks to network tap devices. In certain embodiments, packet flows from multiple monitoring points within a packet network communication system are monitored by a plurality of network tap devices to generate tapped packet flows associated with network traffic flowing through the multiple monitored network points. The tapped packet flows are then transmitted from each network tap device to a tap controller. The tap controller then generates one or more pre-processing rules for the network tap devices based upon an analysis of the tapped packet flows. Control messages including the pre-processing rules are then transmitted from the tap controller to the network tap devices. The tapped packet flows are then pre-processed at the multiple network tap devices using the pre-processing rules to generate pre-processed packet flows. These pre-processed packet flows are then transmitted to the tap controller. The tap controller then further processes the pre-processed packet flows to generate output packet flows. The output packet flows are then forwarded to one or more destination devices. Different features and variations can be implemented, as desired, and related systems and methods can be utilized, as well.

For certain disclosed embodiments, packet processing tasks are identified and assigned from higher-intelligence centralized network nodes, such as network packet brokers (NPBs), to lower-intelligence edge network nodes, such as network tap devices. As such, packet flows are pre-processed by the edge network nodes so that processing requirements can be significantly reduced at the centralized network nodes. As one example embodiment, a primary processing device (e.g., network packet broker) analyzes packet flows being monitored by a plurality of edge processing devices (e.g., network tap devices) and determines one or more pre-processing tasks to be performed by the edge processing devices with respect to the packet flows they are monitoring. Pre-processing rules are then generated and communicated to the edge processing devices, and these rules are applied by the edge processing devices to perform the pre-processing tasks. The pre-processing tasks can include a wide variety of functions, including for example packet de-duplication, packet data reduction, packet data reformatting (e.g., header removal, payload removal, etc.), packet type selection (e.g., email traffic, website traffic, application traffic, VOIP traffic, etc.), and/or other packet processing related functions. These pre-processed packet flows can then be provided to the primary processing device. The primary processing device then further processes the packet flows and forwards the resulting processed packets to one or more destination devices such as network analysis tools. These network analysis tools can provide various functions including security, application, user experience, and/or other network analysis and management functions. Advantageously, the embodiments described herein allow packet processing tasks to be pushed to relatively lower cost devices at edges of a network communication system thereby reducing the processing load for higher cost centralized devices and allowing these higher cost devices to effectively handle larger numbers of packet flows from monitored nodes within the network communication system.

Network communication system often include a variety of different network user nodes communicating within the network infrastructure and a variety of different network monitoring nodes that work together to monitor or manage these packet communications. Packet processing devices that provide the network monitoring nodes can include a variety of computing resources, such as processors (CPUs, microcontrollers, etc.) for software-based processing and/or programmable logic devices (e.g., FPGAs, etc.) for logic-based high-speed processing. The cost of a particular network node is often directly dependent upon the amount and nature of the computing resources required for the system to implement its required functions within the overall network monitoring system. For example, a few types of packet processing devices can be considered: (1) data access devices that have limited packet access capabilities and limited computing resources, (2) basic processor devices that have packet formatting capabilities and basic computing resources, and (3) advanced processor devices that have advanced packet processing capabilities and advanced computing resources allowing them to analyze packet traffic, identify user applications, track packets flows and sessions, and/or perform other advanced network management tasks. In a monitoring network, packet traffic is typically tapped using lower cost data access devices and sent upstream for processing and analytics through a series of basic and advanced higher cost processor devices in one or more network tiers within the network monitoring system.

For certain embodiments described herein, downstream advanced processor devices (e.g., network packet broker) analyze packet flows to determine processing functions to be applied to the packet flows flow and identify portions of these functions to delegate to upstream devices (e.g., network tap devices) as pre-processing functions. The advanced processor devices then generate pre-processing rules to implement these pre-processing functions in upstream devices and communicate the pre-processing rules to upstream devices. The upstream devices then receive, store, and apply these pre-processing rules to implement the pre-processing functions with respect to the packet flows they are receiving. This offload pre-processing mechanism improves utilization and efficiency in the system while relieving the advanced processor devices of the delegated pre-processing tasks. For further embodiments, when an upstream monitoring device pre-processes a packet flow, the device can also embed a signature within the pre-processed packets that allows the downstream devices to determine the delegated functions applied to that packet. Still further, the monitoring devices operating within the network can also be configured to advertise to each other their respective processing capabilities and computing resources so that monitoring devices within the network can learn of each other's presence in the network as well as their respective processing capabilities. Other variations could also be implemented while still taking advantage of the pre-processing techniques described herein to push processing tasks to higher density, lower cost upstream network monitoring devices within a larger network monitoring system.

FIG. 1 is a block diagram of an example embodiment for a network communication system 100 including a tap controller 130 that analyzes network traffic and generates pre-processing rules 134 that are pushed to edge monitoring devices provided by various network tap devices including stand-alone network tap devices 110//116/122/128 and routers/gateways 104/106/108 operating in part as network tap devices. The pre-processing rules 134 are then received and applied by the various network tap devices 104/106/108/

110//116/122/128 within the network communication system 100 so that pre-processed packets are received by the tap controller 130. As such, the remaining processing rules 136 to be implemented by the tap controller 130 are reduced. For this embodiment, the tap controller 130 is a downstream, primary processing device, and the various network tap devices 104/106/108/110//116/122/128 are upstream, edge processing devices. In one further embodiment, the tap controller 130 is a network packet broker that processes the pre-processed packets and forwards the resulting processed packets to one or more network monitoring tools 142.

Looking in more detail to FIG. 1, the example embodiment for the network communication system 100 is implemented in a hierarchical topology with multiple tiers of network connected devices including user network devices 102, network routers 104, internal network gateways 106, and external network gateway 108. The user network devices 102 communicate with the routers 104 and, although not shown, can also be configured to communicate directly with each other. The network routers 104 communicate with the user network devices 102, the internal network gateways 106, and each other. The internal network gateways 106 communicate with the network routers 104, the external network gateway 108, and each other. The external network gateway 108 communicates with the internal network gateways 106 and with external network systems. It is noted that additional and/or different network connected devices and topologies could also be used while still taking advantage of the pre-processing management techniques described herein.

To provide network monitoring within the network communication system 100, a number of different stand-alone network tap devices 110, 116, 122, and 128 are associated with various monitoring points within network communication paths within the different network tiers and operate to output copies of network packet traffic received by these devices. In addition, the network routers 104, internal network gateways 106, and external network gateway 108 provide additional monitoring points and operate in part as network tap devices within the network communication system 100 by having ports 112, 118, and 124 that output copies of network packet traffic flowing through these devices. The stand-alone network tap devices 110, 116, 122, and 128 as well as the effective network tap devices 104, 106, and 108 operate to tap network packet flows passing through these network nodes and forwards copies of the tapped packet flows (T) to the tap controller 130. These various tapped packet flows (T) are received by the tap controller 130 as represented by tapped packet flows (T) 138 that are shown as being received by the tap controller 130.

To generate pre-processing rules 134, the tap controller 130 analyzes the tapped packet flows (T) to determine one or more processing tasks represented within its rules library 132 to push to one or more stand-alone network tap devices 110, 116, 122, and 128 and/or to one or more network router/gateway devices 104, 106, and 108. The tap controller 130 then generates pre-processing rules 134 associated with these tasks to be pushed and communicates these pre-processing rules 134 to the selected devices as represented by control messages (C) 140. In addition to providing tapped packet flows (T), the stand-alone network tap devices 110, 116, 122, and 128 are also configured to receive these control messages (C) from the tap controller 130. The routers/gateways 104, 106, and 108 further include control ports 114, 120, and 126 that are configured to receive these control messages (C) from the tap controller 130. Once received, the stand-alone network tap devices 110, 116, 122, and 128 and/or the routers/gateways 104, 106, and 108 store the pre-processing rules and apply them to their respective tapped packet flows to produce pre-processed packets that are then output as the tapped packet flows (T). As such, the packets now being received by the tap controller 120 as tapped flows (T) 138 are pre-processed packets. The tap controller 130 then applies any remaining processing rules 136 for these packet flows. For example, this additional processing rules 136 can be applied to the pre-processed packets prior to the resulting processed packets being forwarded to other network devices such as network monitoring tools 142.

It is noted that the user network devices 102 can include any of a wide variety of systems that are connected within a network communication system. These systems can include server systems, data storage systems, desktop computer systems, portable computer systems, network switches, and/or any other desired network connected systems that communicate network packets. It is further noted that any number of network monitoring tools 142 can be connected to the tap controller 130, and these network monitoring tools 142 can be any of a wide variety of network related tools including traffic monitoring devices, packet sniffers, data recorders, voice-over-IP monitors, intrusion detection systems, network security systems, application monitors and/or any other desired network management or security tool device or system. Still further, one or more of the network devices within the network communication system 100 can be implemented in whole or in part as virtual machine platforms within virtual processing environments. It is further noted that the network communications can be based upon any desired protocol or combination of packet communication protocols including Ethernet protocols, multi-protocol label switching (MPLS) protocols, Fibre-Channel (FC) protocols and/or any other desired communication protocols for packet-based network communications.

Figure 2:
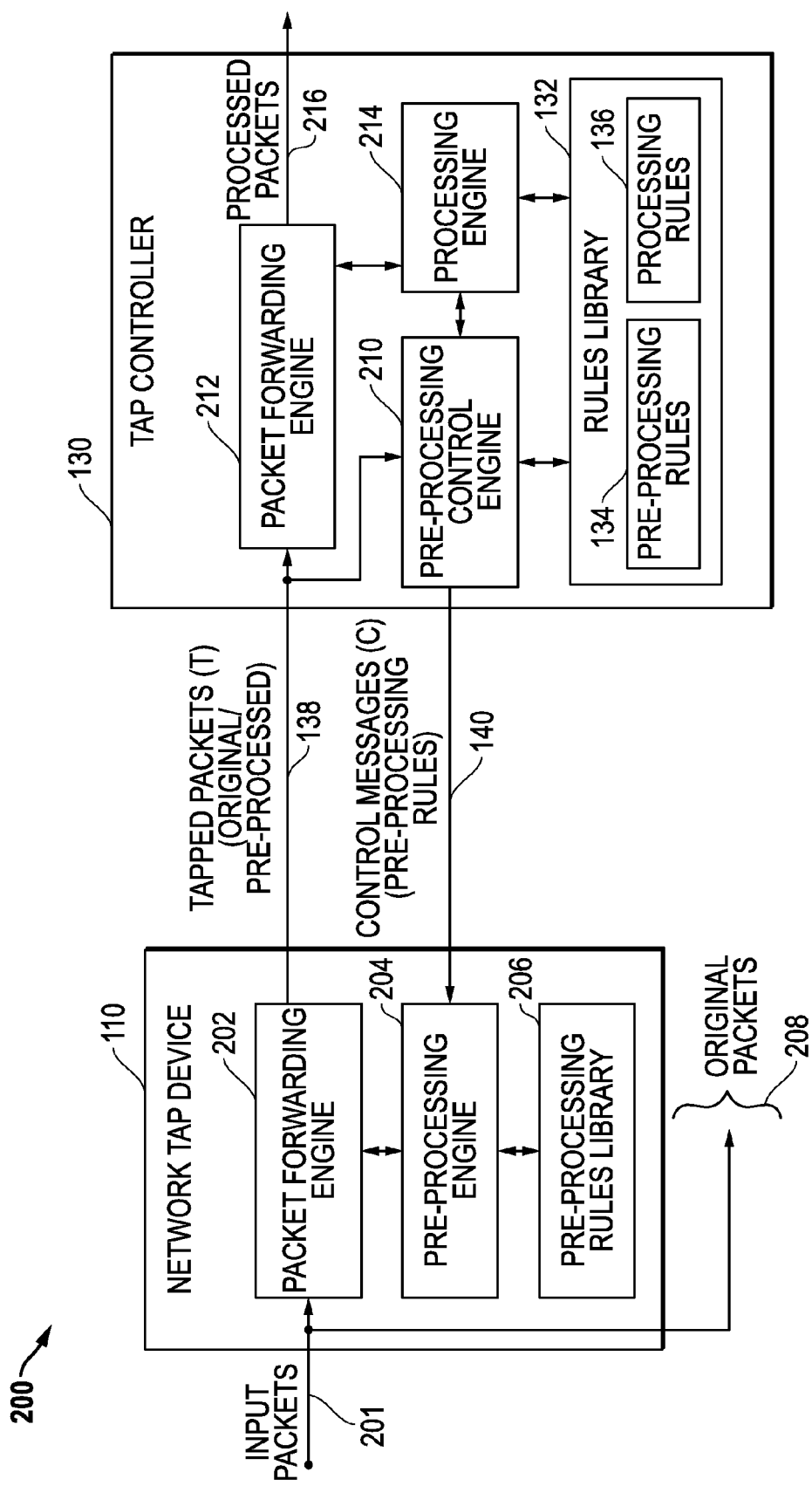
FIG. 2 is a block diagram of an example embodiment for communications between the tap controller and a particular example network tap device such as one of the stand-alone network tap devices.

FIG. 2 is a block diagram of an example embodiment 200 for communications between the tap controller 130 and an example network tap device such as one of the stand-alone network tap devices 110. Initially, the network tap device 110 receives input packets 201 and forwards the original packets 208 to one or more intended destination devices for the input packets and associated packet flows. The network tap device 110 also includes a packet forwarding engine 202 that generates a copy of the input packets 201. These copied packets are then output as tapped packets (T) 138 that are sent to the tap controller 130. Initially, these tapped packets (T) 138 represent the original packets without application of pre-processing rules.

The tap controller 130 includes a pre-processing control engine 210 that analyzes the tapped packets (T) 138 and determines pre-processing rules 134 to push to the network tap device 110. In addition to storing pre-processing rules generated by the pre-processing control engine 210, the rules library 132 also stores processing rules 132 to be applied by the processing engine 214 to the packet forwarding engine 212. The pre-processing rules 134 can represent one or more tasks offloaded from the processing rules 136, can represent new tasks desired to be applied by the network tap device 110, and/or other desired tasks for the network tap device 110. The pre-processing control engine 210 then sends control messages (C) 140 representing the pre-processing rules 134 back to the network tap device 110.

The network tap device 110 includes a pre-processing engine 204 that receives and processes the control messages (C). The pre-processing rules 134 communicated to the network tap device 110 are then stored in the local pre-processing rules library 206. The pre-processing engine 204 then applies the pre-processing rules from the pre-processing rules library 206 to the packet forwarding engine 202. The packet forwarding engine 202 implements these pre-processing rules with respect to the input packets 202 to generate pre-processed packets as the tapped packets (T) 138 sent to the tap controller 130.

The tap controller 130 receives the pre-processed packets as the tapped packets (T) 138 from the network tap device 110 along with similar pre-processed packet traffic from other network tap devices within the network communication system 100. The processing engine 214 applies the processing rules 136 to the packet forwarding engine 212. The packet forwarding engine 212 implements these processing rules 136 to generate processed packets 216. These processed packets 216, for example, can be forwarded to one or more destination network devices such as network monitoring tools 142.

It is noted that similar communications can occur between other stand-alone network tap devices 110, 116, 122, and 128 and the effective network tap devices provided by router/gateways 104, 106, and 108. In addition, similar packet forwarding engines 202, pre-processing engines 204, and pre-processing rules libraries 206 can be included within these additional devices. It is further noted that additional tap controllers 130 can also be used having overlapping or dedicated control of the different tap locations within the network communication system.

It is further noted that the tap controller 130 and/or one or more of the various network tap devices 104/106/108/110//116/122/128 can be implemented in part or in whole using one or more programmable integrated circuits programmed to perform the operations and functions described herein, and the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Further, one or more virtual machine (VM) platforms operating within a virtual processing environment hosted by one or more host processing systems can also be used in whole or in part to implement the tap controller 130 and/or one or more of the various network tap devices 104/106/108/110//116/122/128. Other implementations could also be used while still taking advantage of the pre-processing management techniques described herein.

Figure 3:
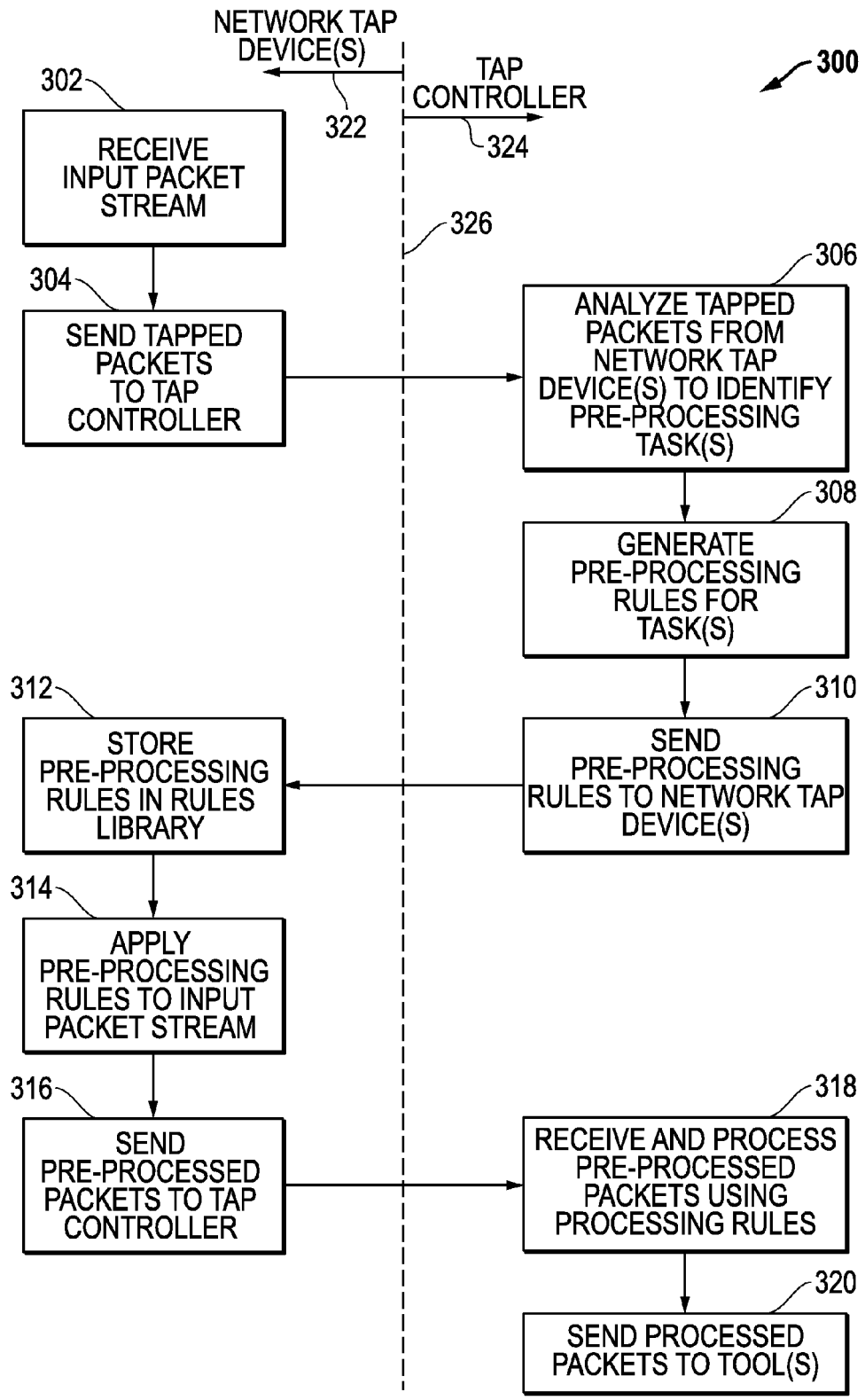
FIG. 3 is a process flow diagram of an example embodiment 300 for actions performed at one or more network tap devices, such as network tap devices 110, and at tap controller 130.

FIG. 3 is a process flow diagram of an example embodiment 300 for actions performed at one or more network tap devices, such as network tap devices 110, and at tap controller 130. Actions to the left of dashed line 326 represent actions performed by the network tap devices 110 as indicated by arrow 322, and actions to the right of dashed line 326 represent actions performed by the tap controller 130 as indicated by arrow 324. In block 302, an input packet stream is received at the network tap devices 110. In block 304, the tapped packets (T) is sent from each of the network tap devices 110 to the tap controller 130. In block 306, the tap controller 130 analyzes the tapped packet from the network tap devices 110 to identify one or more pre-processing tasks to push to the network tap devices 110. In block 308, the tap controller 130 then generates pre-processing rules 134 for the pre-processing tasks to be pushed. In block 310, the tap controller 130 sends the pre-processing rules to the network tap devices 110. In block 312, the network tap devices 110 process and store the pre-processing rules in their local rules libraries 206. In block 314, the network tap devices 110 apply the pre-processing rules to their respective input packet streams 201. In block 316, the network tap devices 110 send their pre-processed packets to the tap controller 130 as their tapped packets (T). In block 318, the pre-processed packets are received by the tap controller 130 and then processed by the tap controller 130 using the processing rules 136. The tap controller 130 then forwards the resulting processed packets 216 to one or more network destinations such as network monitoring tools 142. It is again noted that similar communications can occur between the tap controller 130 and other network tap devices 104, 106, 108, 116, 122, and 128. In addition, additional and/or different process flow steps can be used while still taking advantage of the pre-processing management techniques described herein.

With respect to the pre-processing rules 134 generated by the tap controller 130, it is noted that different sets of rules can be generated and pushed to different sets of network tap devices installed and operating within the network communication system 100. In particular, each network tap device 104/106/108/110//116/122/128 could be sent a different set of pre-processing rules that are stored in the local pre-processing rule library 206 for that particular network tap device and then applied by the particular network tap device to the input packets 202 that it receives. As such, the tap controller 130 can intelligently manage the pre-processing that is being conducted by the various network tap devices within the network communication system 100. TABLE 1 below provides a simplified example of how a plurality of different pre-processing rules 134 can be generated and applied to different network tap devices within the network communication system 100. For TABLE 1, an "X" indicates that the rule has been sent to the network tap device for storage and application to its packet flows. The tap controller 130 can store pre-processing rule allocation information for network tap devices as one or more lookup tables stored within the tap controller 130, for example, as part of the rules library 132.

TABLE 1

EXAMPLE LOOK-UP TABLE FOR PRE-PROCESSING RULES ASSIGNED TO VARIOUS NETWORK TAP DEVICES

| Pre-Processing Rule | TAP1 | TAP2 | TAP3 | TAP4 | ... | TAP(N) |
|---|---|---|---|---|---|---|
| RULE1 | X | | | | ... | X |
| RULE2 | | X | X | | ... | |
| RULE3 | | | X | | | X |
| RULE4 | X | | | X | | X |
| ... | | | | | | ... |
| RULE(N) | X | X | | | ... | X |

The pre-processing rules 134 generated by the tap controller 130 and pushed to network tap devices 104/106/108/110//116/122/128 can be configured in a variety of ways to reduce of packet processing required by the tap controller 130. For example, the pre-processing rules 134 can be configured to facilitate deduplication of packets received by the tap controller 130, remove certain types of packets received by the tap controller 130, modify the contents of packets received by the tap controller 130, and/or perform any other desired pre-processing task. The pre-processing rules can also be configured to modify packet contents prior to being sent as tapped packets (T) to the tap controller 130. Other packet pre-processing could also be implemented, as desired, while still taking advantage of the pre-processing management techniques described herein.

Figures 4A, 4B, 4C:
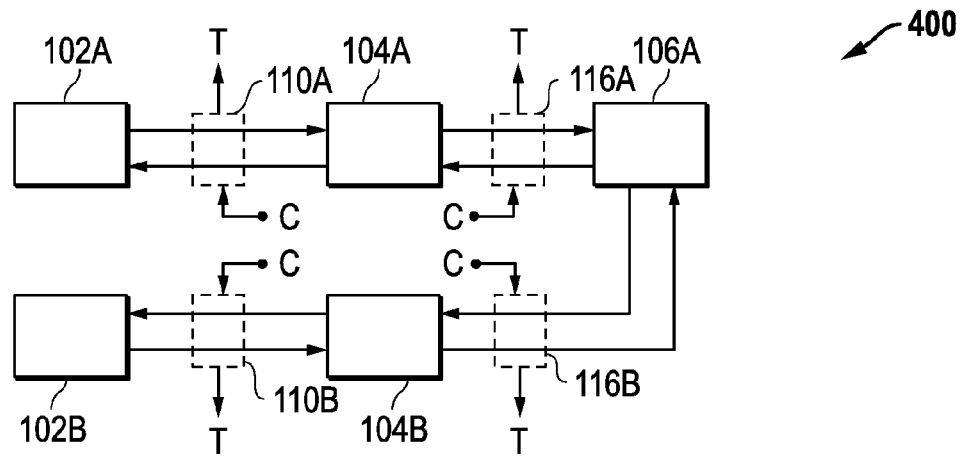
FIG. 4A is a block diagram is provided of an example embodiment for network communications between two user network devices through two network routers and a single internal network gateway.
FIG. 4B provides an example embodiment for pre-processing rules that cause the upstream devices to drop duplicate packets.
FIG. 4C provides an example embodiment for pre-processing rules that cause the upstream devices to pass only certain types of packets and/or remove or modify packet contents.

FIGS. 4A-C describe an example embodiment where pre-processing rules are used to provide deduplication and/or packet removal/modification tasks to packets being received by the tap controller 130. Looking first to FIG. 4A, a block diagram is provided of an example embodiment 400 for network communications between two user network devices 102A and 102B through two network routers 104A and 104B and a single internal network gateway 106A. Network tap device 110A generates tapped packets (T) for the communication path between the user network device 102A and the network router 104A. Network tap device 110B generates tapped packets (T) for the communication path between the user network device 102B and the network router 104B. Network tap device 116A generates tapped packets (T) for the communication path between the network router 104A and the internal network gateway 106A. Network tap device 116B generates tapped packets (T) for the communication path between the network router 104B and the internal network gateway 106B.

As can be seen in for embodiment 400, packets traveling from user network device 102A to user network device 102B will be seen by each of the network tap devices 110A, 110B, 116A, and 116B. Assuming that the packet headers for these packets include source and destination identifiers, these packets will also have the user network device 102A identified as the source device and will have the user network device 102B identified as the destination device. As such, the tapped packets (T) received by the tap controller 130 will include three duplicate versions of these packets that are offset in time and that have the same source/destination identifiers. Similarly, packets traveling from user network device 102B to user network device 102A will be seen by each of the network tap devices 110A, 110B, 116A, and 116B. Again assuming that the packet headers for these packets include source and destination identifiers, these packets will also have the user network device 102B identified as the source device and will have the user network device 102A identified as the destination device. As such, the tapped packets (T) received by the tap controller 130 will also include three duplicate versions of these packets that are offset in time and that have the same source/destination identifiers.

In certain embodiments, the tap controller 130 is configured to analyze the tapped packets (T) from the various network tap devices 110A, 110B, 116A, and 116B to identify and remove duplicate packets. This deduplication processing can require significant computing resources and processing time at the tap controller 130. From an analysis of the tapped packets (T) from network tap devices 110A, 110B, 116A, and 116B, the tap controller 130 can determine that network tap devices 110A, 110B, 116A, and 116B are likely receiving packets from the same packet streams. As such, the tap controller 130 can generate pre-processing rules 134 that cause the network tap devices 110A, 110B, 116A, and 116B to drop the duplicate packets being seen by upstream devices. As such, only a single version is received in the tapped packets (T) by the tap controller 130 for the packet flow from user network device 102A to user network device 102B and for the packet flow from user network device 102B to user network device 102A.

FIG. 4B provides an example embodiment 450 for pre-processing rules that cause the upstream devices to drop duplicate packets. Rule 452 provides that packets be dropped if they have user network device 102A identified as the source device and user network device 102B identified as the destination device. This rule 452 is then pushed to network tap devices 110B, 116A, and 116B, which are upstream from user network device 102A for this packet flow. Network tap devices 110B, 116A, and 116B then receive, store, and apply this rule 452 with respect to their incoming packet streams. As such, only the tapped packets (T) from network tap device 110A will include packets from user network device 102A that are sent to user network device 102B. Similarly, rule 454 provides that packets be dropped if they have user network device 102B identified as the source device and user network device 102A identified as the destination device. This rule 454 is then pushed to network tap devices 110A, 116A, and 116B, which are upstream from user network device 102B for this packet flow. Network tap devices 110A, 116A, and 116B then receive, store, and apply this rule 454 with respect to their incoming packet streams. As such, only the tapped packets (T) from network tap device 110B will include packets from user network device 102B that are sent to user network device 102A.

FIG. 4C provides an example embodiment 470 for pre-processing rules that cause the upstream devices to pass only certain types of packets and/or remove or modify packet contents. Rule 472 provides that packets be passed only if they have are a particular type of packet represented by "X" for rule 472. For example, one or more parameters associated with packets and/or packet contents can be used to identify whether a packet falls within type "X" and is passed or whether a packet is not of type "X" and is not passed. Rule 474 provides that packet contents are removed and/or modified. For embodiment 470, rule 472 is pushed to network tap devices 110A, 110B, and 116B. Rule 474 is pushed to network tap devices 110A, 116A, and 116B. As such, only packets of TYPE X are forwarded within the tapped packet flows (T) from network tap devices 110A, 110B, and 116B to tap controller 130, and packet contents are removed or modified within the tapped packets flows (T) from network tap devices 110A, 116A, and 116B. Although these is relatively simple rule examples, it is seen that one or more sets of rules can be identified and pushed out by the tap controller 130 to determine what types of packets it receives in the tapped packet flows (T) 138 as well as what type of modifications are desired to the received packets.

As indicated above, the network tap devices can also be configured to add a signature to the tapped packets (T) to indicate that the packets have been pre-processed and also to indicate what modifications, if any, have been made to the packets. Such a pre-processing signature can be particularly useful, for example, where packet contents have been modified or otherwise changed as part of the pre-processing implemented by the pre-processing rules stored and applied by the network tap devices. These pre-processing signatures can then be used by the tap controller 130 and/or by other upstream devices that receive the tapped packets (T) from the network tap devices that have been pre-processed.

Figure 5:
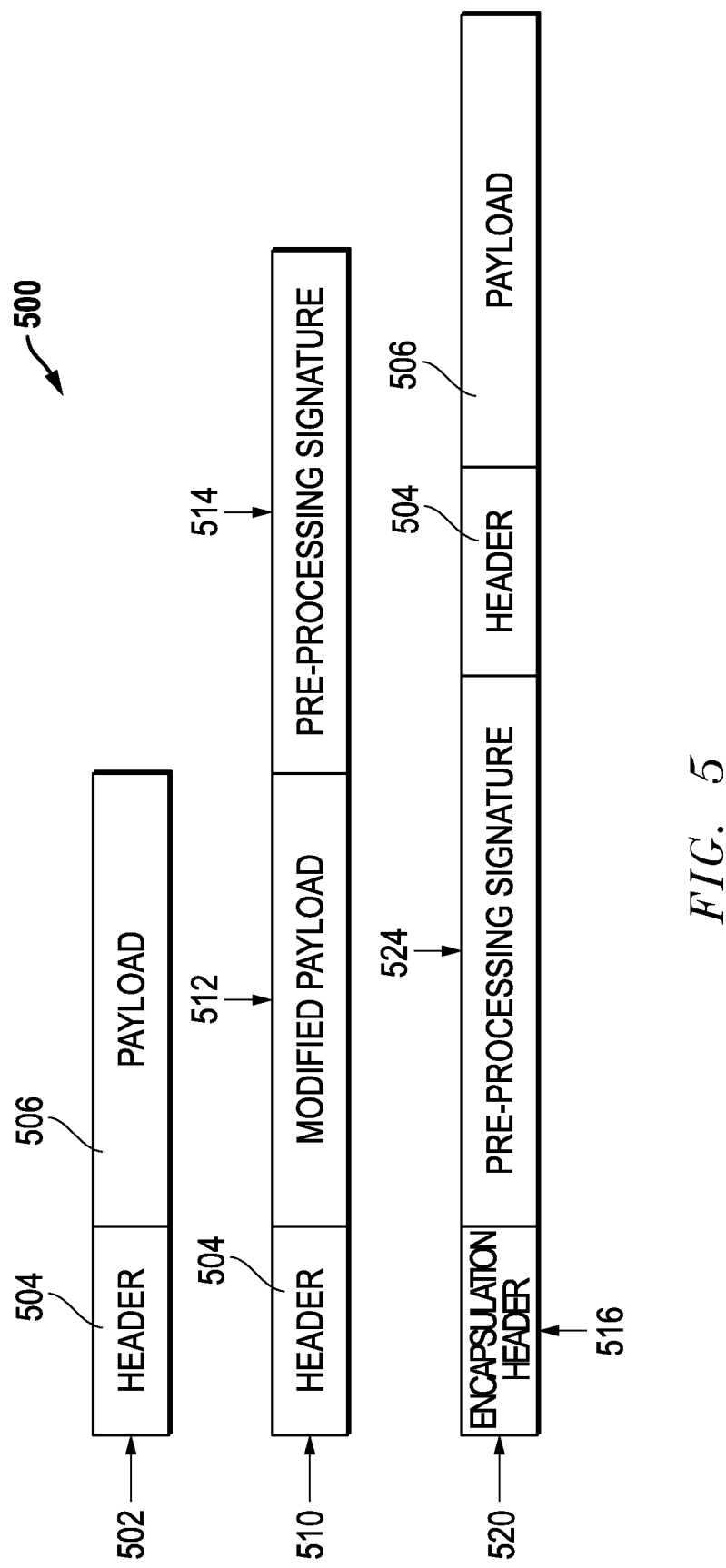
FIG. 5 provides example embodiment where a packet signature has been added to a packet to indicate that the packet has been pre-processed by a network tap device.

FIG. 5 provides example embodiment 500 where a packet signature has been added to a packet to indicate that the packet has been pre-processed by a network tap device. For the example embodiment 500, the original packet 502 includes a header 504 and a payload 506. A variety of fields and related values can be included in the header 502, and the payload 506 can include a wide variety of data hat is carried by the packet 502. Packet 510 is an example tapped packet where a network tap device has modified payload 506 to form a modified payload 512 based upon one or more pre-processing rules 134. For packet 510, the network tap device has also appended a pre-processing signature 514 to the original packet 502 to indicate that the packet has been pre-processed. Packet 520 is an example tapped packet where a network tap device has pre-processed the packet without modifying the payload 506. For packet 520, the network tap device has also added an encapsulation header 516 to the original packet 502 along with inserting a pre-processing signature 524 into the original packet 502 to indicate that the packet has been pre-processed. As indicated above, the signatures 514 and 524 can indicate that the packet has been pre-processed and can indicate what pre-processing has been done by the network tap device. The tap controller 130 and/or another upstream device can then recognize the pre-processing signature 514/524, determine that pre-processing rules have been applied to the original packet 502, and determine what pre-processing has been applied. For example, the pre-processing signature 514 can be configured to indicate the type of modifications made to the payload 506 to form the modified payload 512. It is also noted that other portions of the packet 502 could also be modified, such as the header 504. Other variations could also be implemented while still using a pre-processing signature to identify that the packet has been pre-processed as well as to indicate the nature of the pre-processing that was implemented by the network tap device.

In addition to analyzing traffic flow from the network tap devices to generate the pre-processing rules, the tap controller 130 can also be configured to discover the different network tap devices that are operating and monitoring traffic within the network communication system 100 and to determine the processing capabilities for those network tap devices. This discovery of network tap devices and their capabilities can then be used by the tap controller 130 to generate pre-processing rules 134 that are pushed to network tap devices within the network monitoring system for network communication system 100.

Figure 6:
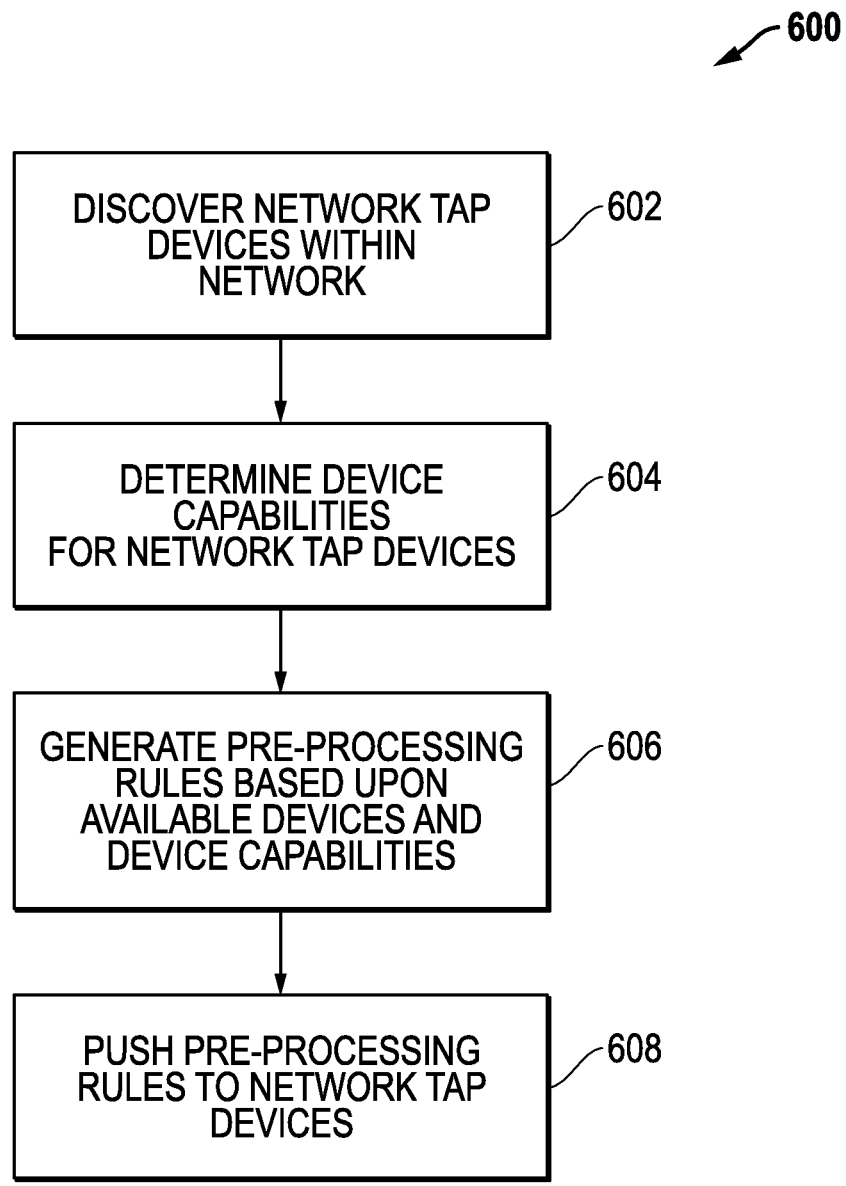
FIG. 6 is a process flow diagram of an example embodiment where a tap controller discovers available network tap devices and determines their respective capabilities.

FIG. 6 is a process flow diagram of an example embodiment 600 where a tap controller 130 discovers available network tap devices and determines their respective capabilities. In block 602, the tap controller 130 discovers the available network tap devices 104/106/108/110//116/122/128 within the network communication system 100. In block 604, the tap controller 130 determines device capabilities for the network tap devices. In block 606, the tap controller 130 generates pre-processing rules based upon available network tap devices and the capabilities of those devices operating within the monitoring system for the packet communication system 100. In block 608, the tap controller 130 pushes the pre-processing rules to the network tap devices for storage and implementation.

It is noted that the discovery process in block 602 can occur using one or more of a variety of techniques. For example, the tap controller 130 can be configured to broadcast one or more interrogation messages into the network. The network tap devices can be configured to receive and to respond to the interrogation messages to provide processing capability information about themselves such as type of device, type of processing resources, available data storage, packet modification capabilities, packet filter capabilities, and/or other information about the device. This broadcast interrogation technique can be repeated periodically by the tap controller 130 in order to identify new network tap devices, dropped network tap devices, and/or other changes to the network tap devices within the network communication system 100. In addition, the network tap devices that are installed and put into operation within the network communication system 100 can be configured to broadcast a message that indicates they have become operational. Upon receiving this installation message, the tap controller 130 can then communicate directly with the newly installed network tap device to determine its capabilities. This installation broadcast and response technique can also be repeated any time the network tap device is rebooted or reset. Other variations and discovery techniques can also be applied.

Figure 7:
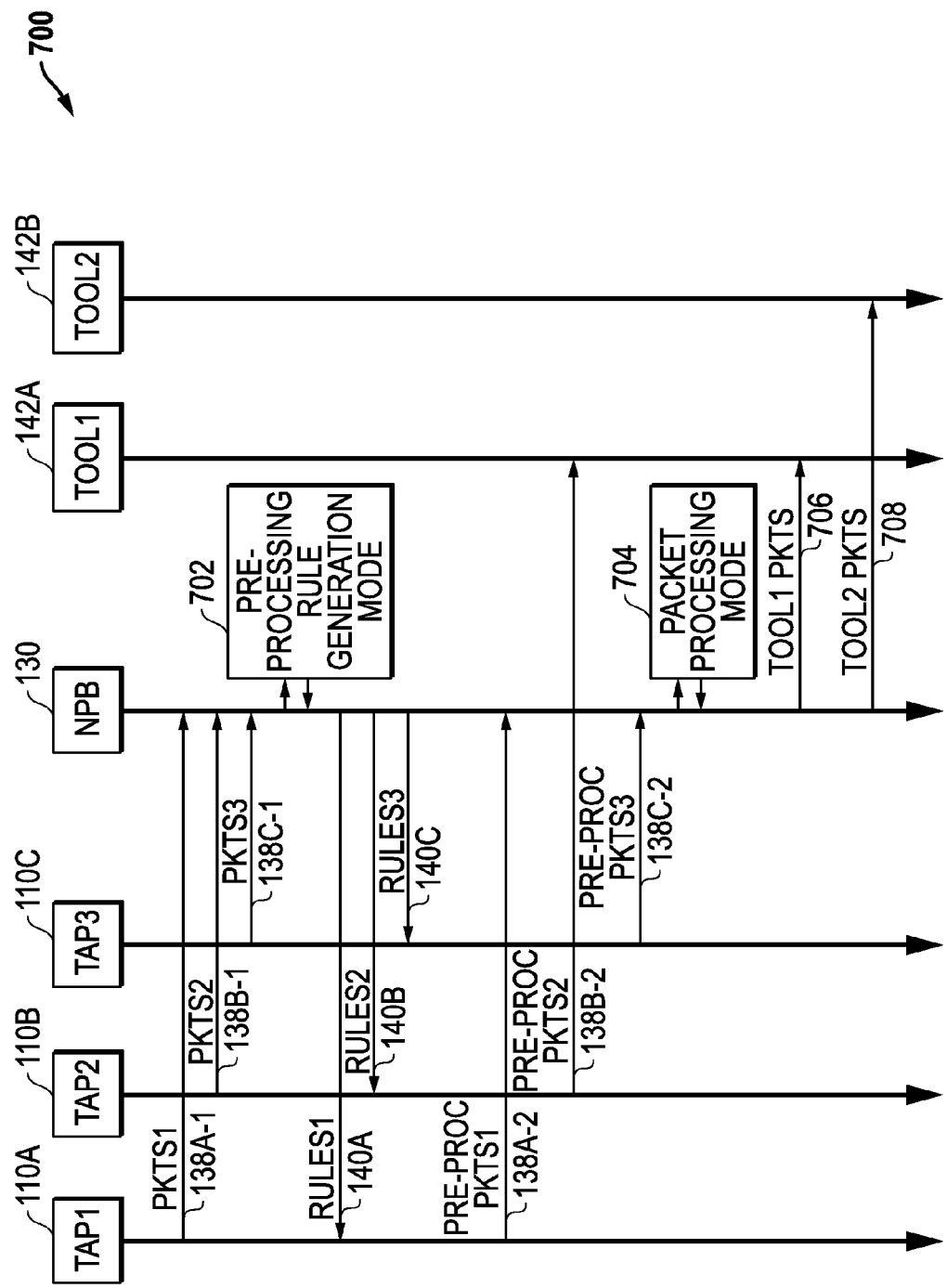
FIG. 7 is a swim lane diagram of an example embodiment for pre-processing where a network packet broker (NPB) operates as a tap controller to control three network tap devices to generate pre-processed packets that are then processed by the NPB and provided to two network monitoring tools.

FIG. 7 is a swim lane diagram of an example embodiment 700 for pre-processing where a network packet broker (NPB) 130 operates as a tap controller to control three network tap devices 110A, 110B, and 110C to generate pre-processed packets that are then processed by the NPB 130 and provided to two network monitoring tools 142A and 142B. Initially in a first learning mode, the first network tap device (TAP1) 110A, the second tap device (TAP2) 110B, and the third network tap device (TAP3) 110C provide to NPB 130 a first flow of tapped packets (PKTS1) 138A-1, a second flow of tapped packets (PKTS2) 138B-1, and a third flow of tapped packets (PKTS3) 138C-1, respectively. Although not shown, it is also noted that the NPB 130 can initiate this first learning mode by communicating a control message to the network tap devices 110A, 110B, and 110C to have them enter the first learning mode where they forward raw copies of the incoming packets to the NPB 130 without applying any pre-processing rules that may be locally stored within the network tap devices 110A, 110B, and 110C.

The NPB 130 as the tap controller then analyzes the tapped packets as part of its pre-processing rule generation mode 702 and generates pre-processing rules to apply to the network tap devices 110A, 110B, and 110C. A first set of pre-processing rules (RULES1) is then communicated by the NPB 130 to the first network tap device 110A in control messages 140A. A second set of pre-processing rules (RULES2) is communicated by the NPB 130 to the second network tap device 110B in control messages 140B. A third set of pre-processing rules (RULES3) is communicated by the NPB 130 to the third network tap device 110C in control messages 140C. It is again noted that these rules can be the same for each of the network tap devices 110A, 110B, and 110C or can be different sets of rules. For example, in embodiment 700, it is assumed that the second network tap device 110B has been instructed through control messages 140B to forward its pre-processed packets (PRE-PROC PKTS2) 138B-2 directly to the first monitoring tool (TOOL1) 142A while network tap device 110A and 110C are to forward their pre-processed packets to NPB 130.

The network tap devices 110A, 110B, and 110C receive and store their respective pre-processing rules that were received through control messages 140A, 140B, and 140C, respectively. In a second pre-processing mode, the network tap device 110A applies its pre-processing rules and generates pre-processed packets (PRE-PROC PKTS1) 138A-2 that are communicated as tapped packets back to the NPB 130. In the second pre-processing mode, the network tap devices 110B also applies its pre-processing rules and generates pre-processed packets (PRE-PROC PKTS2) 138B-2. However, as indicated above, these pre-processed packets (PRE-PROC PKTS2) 138B-2 are communicated as tapped packets directly to the first monitoring tool (TOOL1) 142A. Similar to network tap device 110A for the second pre-processing mode, the network tap devices 110C applies its pre-processing rules and generates pre-processed packets (PRE-PROC PKTS3) 138C-2 that are communicated as tapped packets back to the NPB 130.

The NPB 130 as the tap controller then performs its own packet processing in packet processing mode 704 according to any remaining processing rules 136 it has to apply to the pre-processed packets 138A-2 and 138C-2 that it has received. Based upon its packet processing, the NPB 130 then identifies and forwards packets for the first monitoring tool (TOOL1) 142A as forwarded packets (TOOL1 PKTS) 706. The NPB 130 also identifies and forwards packets for the second monitoring tool (TOOL2) 142B as forwarded packets (TOOL2 PKTS) 708. The network monitoring tools 142A and 142B can then provide their respective analysis such as security analysis, threat analysis, intrusion detection, and/or other network monitoring functions.

Figure 8A:
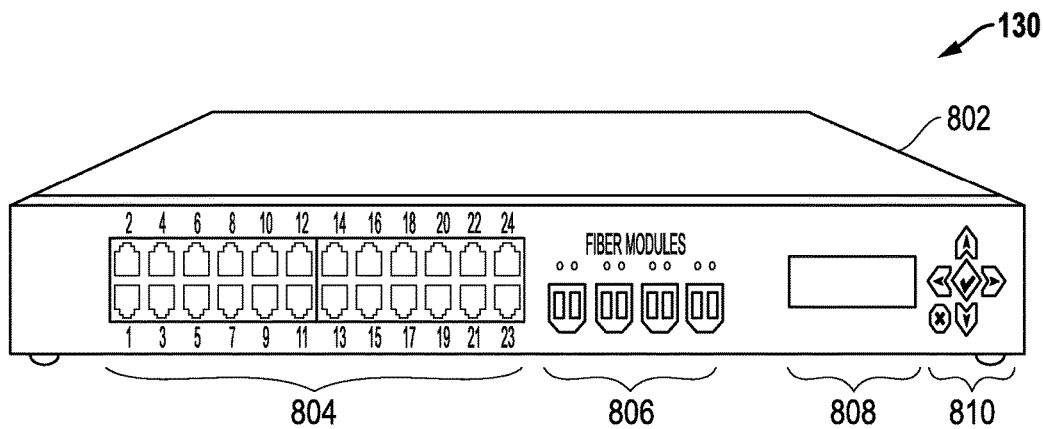
FIG. 8A is a diagram of an example embodiment for a product configuration as well as external connections for an example tap controller.

FIG. 8A is a diagram of an example embodiment for a product configuration as well as external connections for an example tap controller 130. As depicted, the tap controller 130 includes a housing 802 having external connections for a variety of connector types. For example, Ethernet port connectors 804 can be provided (e.g., Ethernet ports 1-24), and fiber optic connectors 806 can be provided for fiber optic connector modules. Further, a display screen, such a back-lit LCD (liquid crystal display) screen 808, can also be included to display information related to the tap controller 130. Direct navigation controls 810 can also be included, for example, for navigation of management menus displayed in screen 810. Although not shown, a separate management network port can also be provided, for example, on the back of housing 802. This management network port can provide a control and management network interface for the packet tap controller 130. It is further noted that circuitry for the tap controller 130, including PCBs (printed circuit boards) and power supply circuitry, can be mounted within the housing 802. Other variations can also be implemented while still taking advantage of the packet pre-processing control techniques described herein.

Figure 8B:
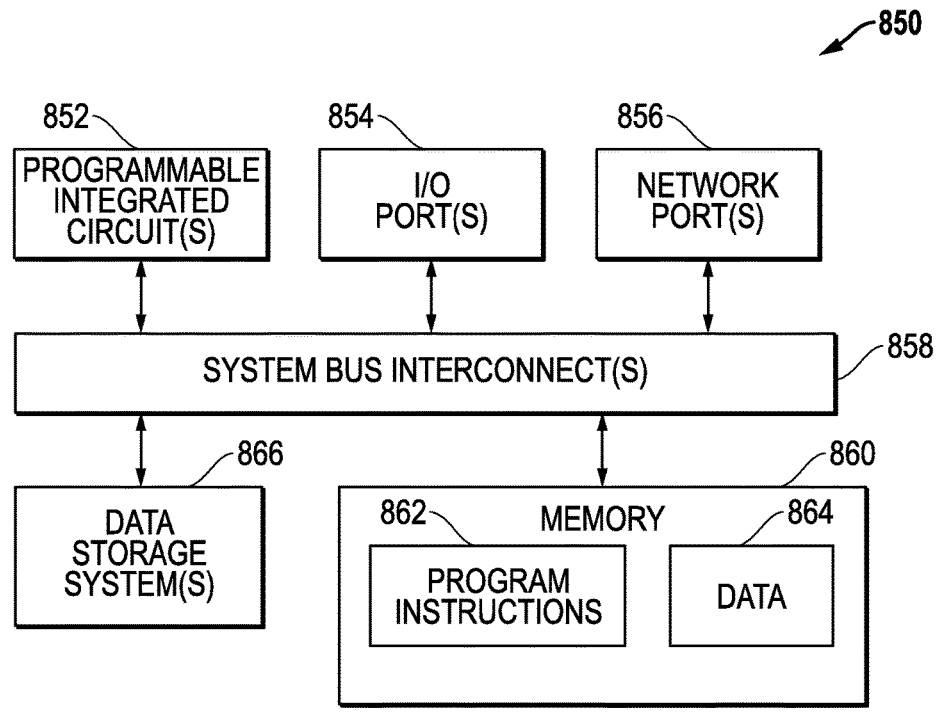
FIG. 8B is a block diagram of an example embodiment for a computing platform that can be used to implement a tap controller and/or network tap devices.

FIG. 8B is a block diagram of an example embodiment for a computing platform 850 that can be used to implement the tap controller 130 and/or one or more of the various network tap devices 104/106/108/110//116/122/128. The computing platform 850 includes one or more programmable integrated circuits 852, one or more input/output (I/O) ports 854, one or more network ports 856, one or more data storage systems 866, and memory 860 coupled to communicate with each other through a system bus interconnect 858. The memory 860 can include one or more memory devices that store program instructions 862 and/or data 864 that are used for operation of the computing platform 850. For example, during operation, one or more of the programmable integrated circuit(s) 852 can load software or program instructions stored in the data storage systems 866 into the memory 860 and then execute the software or program instructions to perform the operations and functions described herein. In addition, for operation, one or more of the programmable integrated circuit(s) can also be programmed with code or logic instructions stored in the data storage systems 866 to perform the operations and functions described herein. It is noted that the data storage system(s) 866 and the memory 860 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMS, and/or other non-transitory data storage mediums It is further noted that the programmable integrated circuit(s) 852 can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the pre-processing and network tap control techniques described herein.

Further, the disclosed embodiments can also be implemented as one or more virtual machine (VM) platforms within a virtual processing environment hosted by one or more host processing systems. FIGS. 9A-B provide example embodiments of virtual environments. For example, one or more of the components within the embodiment 100 of FIG. 1 can be virtualized such that they operate as one or more VM platforms within a virtual environment. Virtual resources can be made available, for example, through processors and/or processing cores associated with one or more server processing systems or platforms (e.g., server blades) used to provide software processing instances or VM platforms within a server processing system. A virtual machine (VM) platform is an emulation of a processing system that is created within software being executed on a VM host hardware system. By creating VM platforms within a VM host hardware system, the processing resources of that VM host hardware system become virtualized for use within the network communication system. The VM platforms can be configured to perform desired functions that emulate one or more processing systems.

Figure 9:
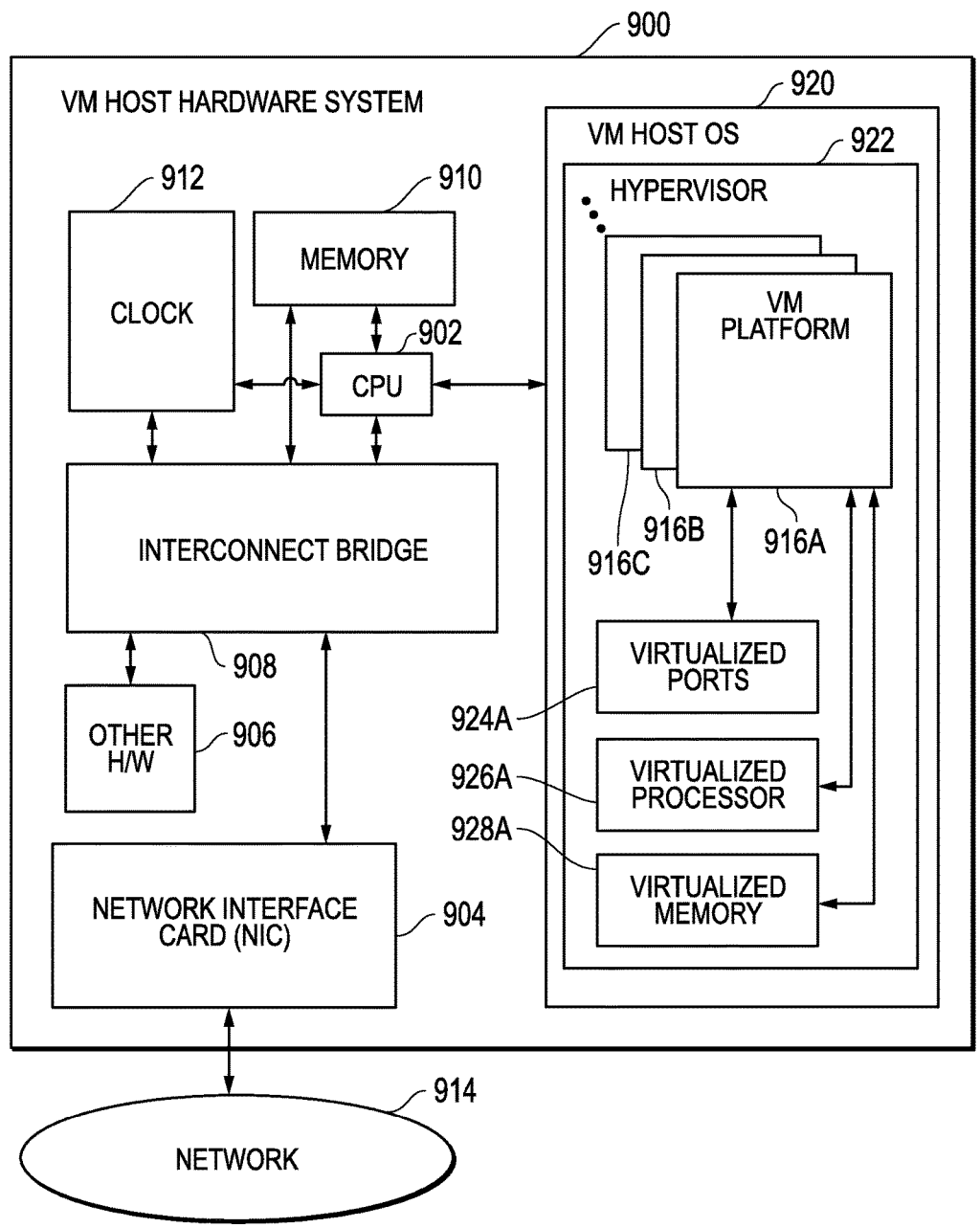
FIG. 9 is a block diagram of an example embodiment for a virtual machine (VM) host hardware system that communicates with a network such as a packet network communication system.

FIG. 9 is a block diagram of an example embodiment for a virtual machine (VM) host hardware system 900 that communicates with a network 914 such as a packet network communication system in FIG. 1 above. For the example embodiment depicted, the VM host hardware system 900 includes a central processing unit (CPU) 902 (or one or more other programmed integrated circuits) that runs a VM host operating system 920. An interconnect bridge 908 couples the CPU 902 to additional circuitry and devices within the VM host hardware system 900. For example, a system clock 912, a network interface card (NIC) 904, a memory 910 and other hardware (H/W) 906, such as additional data storage systems (e.g., hard drive, solid state drive, etc.), are coupled to the CPU 902 through the interconnect bridge 908. Other hardware elements and variations can also be provided.

The VM host hardware system 900 also includes a hypervisor 922 that executes on top of the VM host operating system (OS) 920. This hypervisor 922 provides a virtualization layer including one or more VM platforms 916A, 916B, 916C . . . that emulate processing systems, such as the tap controller 130, the network tap devices 104/106/108/110//116/122/128, and/or other network components and devices described above. As shown with respect to VM platform 916A, each of VM platforms 916A, 916B, 916C . . . can be configured to have one or more virtual hardware resources associated with it, such as virtualized ports 924A, a virtualized processor 926A, a virtualized memory 928A, and/or other virtualized hardware resources. The VM host hardware system 900 hosts each of the VM platforms 916A, 916B, 916C . . . and provides connectivity to the network 914 through the VM host operating system 920 and the hypervisor 922. As such, the hypervisor 922 provides a management and control virtualization interface layer for the VM platforms 916A-C. It is further noted that the VM host operating system 920, the hypervisor 922, and the VM platforms 916A-C, as well as corresponding virtualized hardware resources, can be implemented, for example, using computer-readable instructions stored in one or more non-transitory data storage mediums that are executed by or used to program one or more programmable integrated circuits, such as the CPU 902, so that they are programmed to perform the operations and functions for the VM host hardware system 900. Other variations could also be implemented while still taking advantage of the pre-processing and network tap control techniques described herein.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the pre-processing management techniques described herein.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method to forward packets from multiple monitoring points within a packet network communication system to one or more destination devices, comprising:
    monitoring, with a plurality of network tap devices, multiple points within a network to generate tapped packet flows associated with network traffic flowing through the multiple points;
    transmitting the tapped packet flows from each network tap to a tap controller;
    generating, with the tap controller, one or more pre-processing rules for the network tap devices based upon the tapped packet flows including pre-processing rules to drop duplicate packets within the tapped packet flows already received at other network tap devices;
    transmitting control messages from the tap controller to the network tap devices, the control messages including the pre-processing rules;
    pre-processing the tapped packet flows at the plurality of network tap devices using the pre-processing rules to generate pre-processed packet flows while dropping duplicate packets so that only a single version of packets are included within the pre-processed packet flows received from the plurality of network tap devices;
    transmitting the pre-processed packet flows to the tap controller;
    further processing the pre-processed packet flows with the tap controller to generate output packet flows; and
    forwarding the output packet flows to one or more destination devices.

2. The method of claim 1, wherein the control messages from the tap controller to the network tap devices include different sets of pre-processing rules for different network tap devices.

3. The method of claim 1, further comprising transmitting a learning command message from the tap controller to the network tap devices to cause the network tap devices to transmit the tapped packet flows to the tap controller.

4. The method of claim 1, further comprising discovering, with the tap controller, processing capabilities of the network tap devices.

5. The method of claim 4, wherein the discovering is triggered by at least one of an interrogation message broadcast by the tap controller to the network tap devices or messages sent from the network tap devices to the tap controller when the network tap devices become operable within the network.

6. The method of claim 1, wherein the one or more destination devices comprises one or more network monitoring tools.

7. The method of claim 1, wherein the pre-processing at the network tap devices comprises passing only a particular type of packet within the pre-processed packet flows.

8. The method of claim 1, wherein the plurality of network tap devices monitor multiple points between two network devices, and wherein the duplicate packets comprise packets having same source and destination identifiers.

9. A network system to forward packets from multiple monitoring points within a packet network communication system to one or more destination devices, comprising:
    a plurality of network tap devices located at multiple points within a network, the network tap devices having tapped packet flows associated with network traffic flowing through the multiple points as outputs in a first mode and having pre-processed packet flows based upon one or more pre-processing rules as outputs in a second mode; and a tap controller having the tapped packet flows from each network tap device as inputs during a first mode and having the pre-processed packet flows from each network tap device as inputs during a second mode, the tap controller being configured to generate one or more pre-processing rules for the network tap devices based upon the tapped packet flows, to transmit control messages to the network tap devices including the pre-processing rules, to further process the pre-processed packet flows, and to forward output packet flows to one or more destination devices;

wherein the one or more pre-processing rules include pre-processing rules to drop duplicate packets within the tapped packet flows already received at other network tap devices, the pre-processing rules being configured to cause the network tap devices to generate pre-processed packet flows while dropping duplicate packets so that only a single version of packets are included within the pre-processed packet flows received from the plurality of network tap devices.

10. The network system of claim 9, wherein the control messages comprise different sets of pre-processing rules for different network tap devices.

11. The network system of claim 9, wherein the tap controller is further configured to transmit a learning command message to the network tap devices to cause the network tap devices to generate the tapped packet flows in the first mode.

12. The network system of claim 9, wherein the tap controller is configured to discover processing capabilities of the network tap devices.

13. The network system of claim 12, wherein a discovery mode is triggered through at least one of an interrogation message broadcast by the tap controller to the network tap devices or messages sent from the network tap devices to the tap controller when the network tap devices become operable within the network.

14. The network system of claim 9, wherein the one or more destination devices comprises one or more network monitoring tools.

15. The network system of claim 9, wherein the one or more pre-processing rules are configured to cause the network tap devices to pass only a particular type of packet within the pre-processed packet flows.

16. The network system of claim 9, the plurality of network tap devices are configured to monitor multiple points between two network devices, and wherein the duplicate packets comprise packets having same source and destination identifiers.

* * * * *